(12) United States Patent
Fukushima et al.

(10) Patent No.: US 11,139,535 B2
(45) Date of Patent: Oct. 5, 2021

(54) CONNECTION MODULE AND ELECTRICITY STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Tetsuya Fujita, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 203 days.

(21) Appl. No.: 16/377,848

(22) Filed: Apr. 8, 2019

(65) Prior Publication Data

US 2019/0334153 A1    Oct. 31, 2019

(30) Foreign Application Priority Data

Apr. 27, 2018  (JP) .............................. JP2018-085918

(51) Int. Cl.
*H01M 50/502* (2021.01)
*H01M 50/543* (2021.01)
(Continued)

(52) U.S. Cl.
CPC ..... *H01M 50/502* (2021.01); *H01M 10/0585* (2013.01); *H01M 10/482* (2013.01);
(Continued)

(58) Field of Classification Search
CPC ............ H01M 2/20; H01M 2/12; H01M 2/30; H01M 10/0585
See application file for complete search history.

(56) References Cited

U.S. PATENT DOCUMENTS

| | | | | |
|---|---|---|---|---|
| 2010/0248029 A1* | 9/2010 | Butt | ...................... | H01M 50/20 429/211 |
| 2011/0052970 A1* | 3/2011 | Kurata | ................... | H01M 2/30 429/158 |
| 2014/0363723 A1 | 12/2014 | Imai et al. | | |

FOREIGN PATENT DOCUMENTS

JP          2014-238986          12/2014

* cited by examiner

*Primary Examiner* — Kenneth J Douyette
(74) *Attorney, Agent, or Firm* — Greenblum & Bernstein, P.L.C.

(57) ABSTRACT

Erroneous identification of parts is prevented. A connection module disclosed in the present specification is a connection module that is to be attached to an electricity storage element group in which a plurality of electricity storage elements each including positive and negative electrode terminals are arranged. The connection module includes: a plurality of busbars configured to connect the electrode terminals of the adjacent electricity storage elements to each other; and an insulating protector configured to be fixed to the electricity storage element group in a state in which the insulating protector holds the plurality of busbars, wherein the insulating protector is formed by a first protector and a second protector that is separate from the first protector, the first protector is provided with a first identifier, and the second protector is provided with a second identifier that is different from the first identifier.

7 Claims, 10 Drawing Sheets

(51) Int. Cl.
  *H01M 10/48* (2006.01)
  *H01M 10/0585* (2010.01)
  *H01M 50/20* (2021.01)
(52) U.S. Cl.
  CPC .......... *H01M 50/543* (2021.01); *H01M 50/20* (2021.01); *H01M 2220/20* (2013.01)

CONNECTION MODULE AND ELECTRICITY STORAGE MODULE

TECHNICAL FIELD

The technique disclosed in the present specification relates to a connection module and an electricity storage module.

BACKGROUND ART

As an example, the busbar module described in JP 2014-238986A is known as a busbar module that serially connects a plurality of batteries arranged on a straight line. The busbar module connects the plurality of batteries in series by electrically connecting the electrodes provided in the batteries to each other using busbars. External connection portions to which an external device such as an electric motor is to be connected are provided on those of the plurality of batteries that are located at opposite ends.

JP 2014-238986A is an example of related art.

SUMMARY OF THE INVENTION

Meanwhile, the external connection portions disposed at the opposite ends of the busbar module have polarities different from each other. However, it is difficult to discern the polarities of the external connection portions, and there is a possibility that a connection may be made with a wrong polarity when connecting the external device to the external connection portions.

The present specification discloses a technique for preventing erroneous identification of parts.

A technique disclosed in the present specification is directed to a connection module that is to be attached to an electricity storage element group in which a plurality of electricity storage elements each including positive and negative electrode terminals, are arranged, the connection module including: a plurality of busbars configured to connect the electrode terminals of the adjacent electricity storage elements to each other; and an insulating protector configured to be fixed to the electricity storage element group in a state in which the insulating protector holds the plurality of busbars, wherein the insulating protector is formed by a first protector and a second protector that is separate from the first protector, the first protector is provided with a first identifier, and the second protector is provided with a second identifier that is different from the first identifier.

With the connection module having such a configuration, it is possible to easily identify the difference between the first protector or the second protector and a protector similar thereto, and between the first protector and the second protector. Furthermore, when different members are attached to the first protector and the second protector, it is possible to identify the members attached to the respective protectors by checking the identifiers.

The connection module disclosed in the present specification may have the following configurations.

It is possible to adopt a configuration in which the insulating protector holds the plurality of busbars, a first external connection member configured to output power of one polarity of the electricity storage element group, and a second external connection member configured to output power of the other polarity of the electricity storage element group, the first identifier is configured as an identifier for identifying the polarity of the first external connection member, and the second identifier is configured as an identifier for identifying the polarity of the second external connection member.

With such a configuration, it is possible to easily identify the polarity of the first external connection member and the polarity of the second external connection member. This makes it possible to prevent an external device from being connected to each of the external connection members with a wrong polarity.

It is possible to adopt a configuration in which the first identifier is formed by a color different from that of the second identifier by the first protector being formed by a color different from that of the second protector.

With such a configuration, the first identifier and the second identifier have colors that are different from each other, as in the case of the respective protectors. Accordingly, the polarity of each of the respective external connection portions can be easily identified, thus making it possible to further prevent erroneous identification of the polarities of the external connection members.

It is possible to adopt a configuration in which each of the first external connection member and the second external connection member is a terminal connection portion to which a terminal of an external device is to be connected, and includes a terminal connection portion disposed on an outer wall of the insulating protector, and the first identifier and the second identifier are provided on the outer wall of the insulating protector on which the terminal connection portions are disposed.

With such a configuration, the identifiers are provided on the outer wall of the insulating protector on which the terminal connection portions are disposed. Accordingly, the polarities of the external connection members can be more easily identified as compared with, for example, a case where the identifiers are provided on an outer wall that is different from the outer wall of the insulating protector on which the terminal connection portions are disposed, thus making it possible to further prevent erroneous identification of polarities for the external connection members when connecting the terminals of the external device thereto.

It is possible to adopt a configuration in which the first protector holds the plurality of busbars, the second protector holds the first external connection member and the second external connection member, a portion of an outer wall of the second protector is formed by an insulating wall disposed between the first external connection member and the plurality of busbars, and the second identifier is provided on the insulating wall.

With such a configuration, an insulating wall for insulating the first external connection member and the busbars from each other can also be used as a wall for providing the identifiers. Accordingly, it is not necessary to separately provide the portion for providing the identifiers, thus making it possible to prevent the structure of the connection module from becoming complex.

It is possible to adopt a configuration in which an electricity storage module includes: the electricity storage element group including a frame configured to accommodate the plurality of electricity storage elements; and the above-described connection module, wherein a portion of the insulating protector on which the first identifier or the second identifier is provided is configured as a guide portion that protrudes to the electricity storage element side, thereby abutting against the frame to guide the connection module to a proper position when mounting the connection module to the electricity storage element group.

With such a configuration, the guide portion used when mounting the connection module to the electricity storage element group can also be used as the portion for providing the identifiers. Accordingly, it is not necessary to separately provide the portion for providing the identifiers, thus making it possible to prevent the structure of the connection module, and hence the structure of the electricity storage module, from becoming more complex.

According to the technique disclosed in the present specification, it is possible to prevent erroneous identification of parts.

EMBODIMENTS OF THE INVENTION

Embodiment

An embodiment of the technique disclosed in the present specification will be described with reference to FIGS. 1 to 10.

Figure 2:
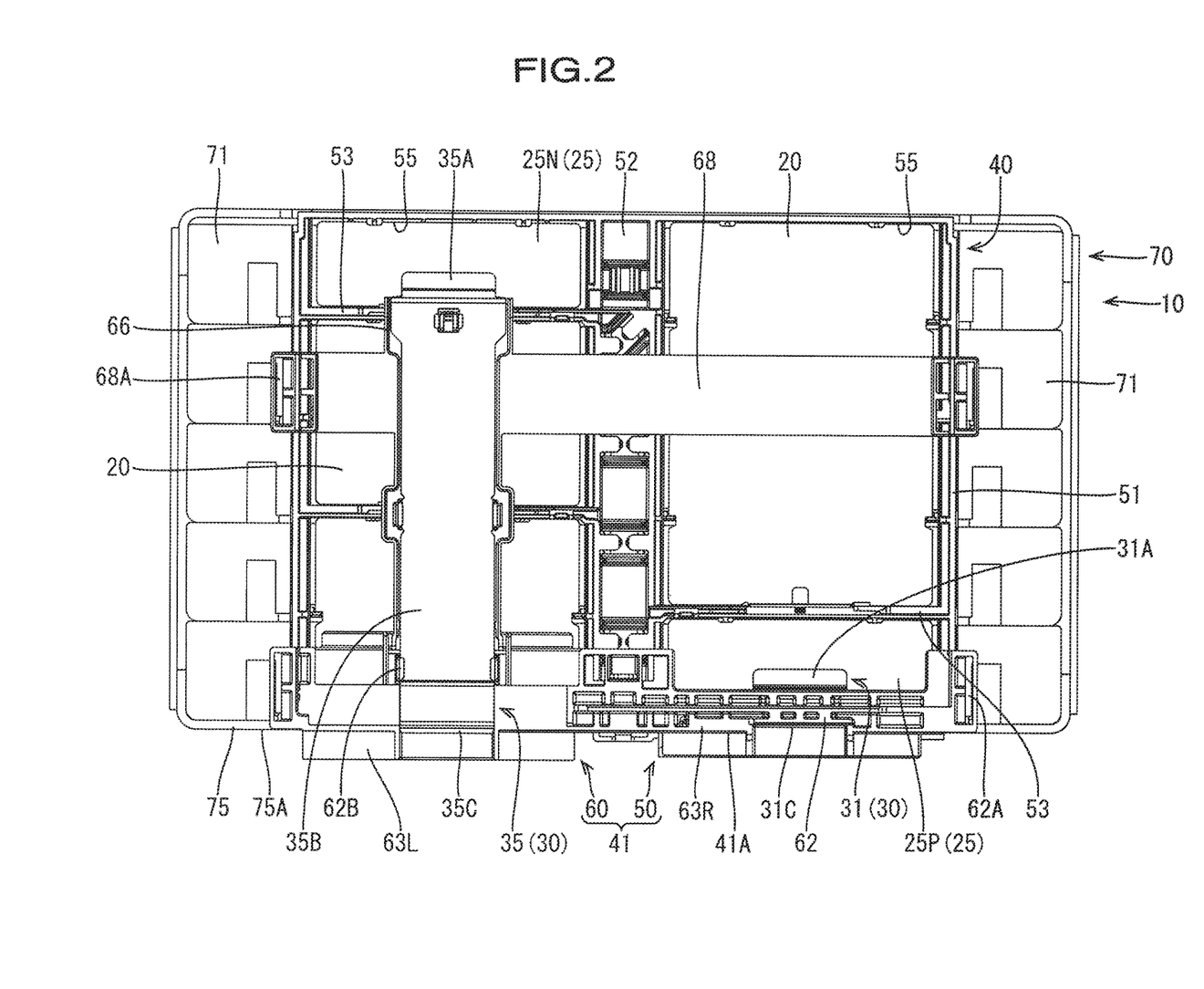
FIG. 2 is a plan view of the electricity storage module.

The present embodiment is an electricity storage module 10 that is mounted, for example, in a vehicle such as an electric car or a hybrid car, and is used as a power source for driving the vehicle. As shown in FIG. 2, the electricity storage module 10 includes an electricity storage element group 70 formed by arranging a plurality of electricity storage elements 71, and a connection module 40 that is attached to the electricity storage element group 70.

Figure 6:
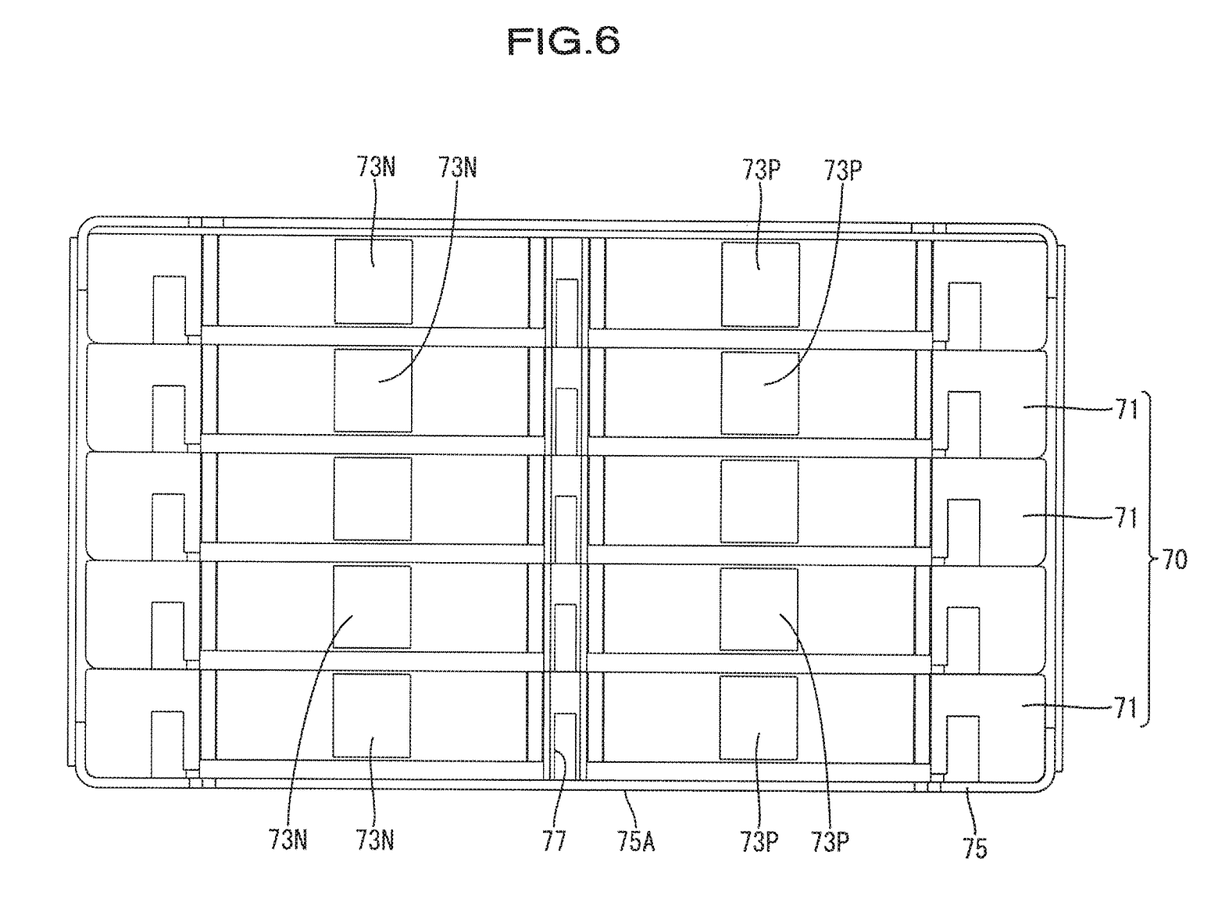
FIG. 6 is a plan view of an electricity storage element group.

Each electricity storage element 71 may be, for example, a secondary battery, and, as shown in FIG. 6, a plurality of (five in the present embodiment) electricity storage elements 71 are accommodated in a frame 75 having a substantially rectangular shape in a plan view, thus forming an electricity storage element group 70.

As shown in FIG. 6, a pair of flat electrode terminals 73 are disposed at positions near opposite end portions, in the lateral direction, on the upper surface of each of the electricity storage elements 71. One of the electrode terminals 73 is configured as a positive electrode terminal 73P, and the other is configured as a negative electrode terminal 73N.

As shown in FIG. 6, the electricity storage elements 71 are accommodated in the frame 75 in a state in which they are arranged in a row in the front-rear direction such that the electrode terminals 73 of different polarities are disposed adjacent to each other in two electricity storage elements 71 that are adjacent to each other in the front-rear direction (i.e., the positive electrode terminal 73P of one electricity storage element 71 and the negative electrode terminal 73N of another electricity storage element 71 adjacent thereto are disposed adjacent to each other).

A locked portion 77, to which a locking portion (not shown) provided on the connection module 40 is to be fitted, is provided between the pair of electrode terminals 73 at the upper portion of each of the electricity storage elements 71. As a result of the locking portions and the locked portions 77 being locked in the vertical direction by the locking portions fitting to the locked portions 77, the connection module 40 is held and fixed onto the electricity storage element group 70.

Figure 4:
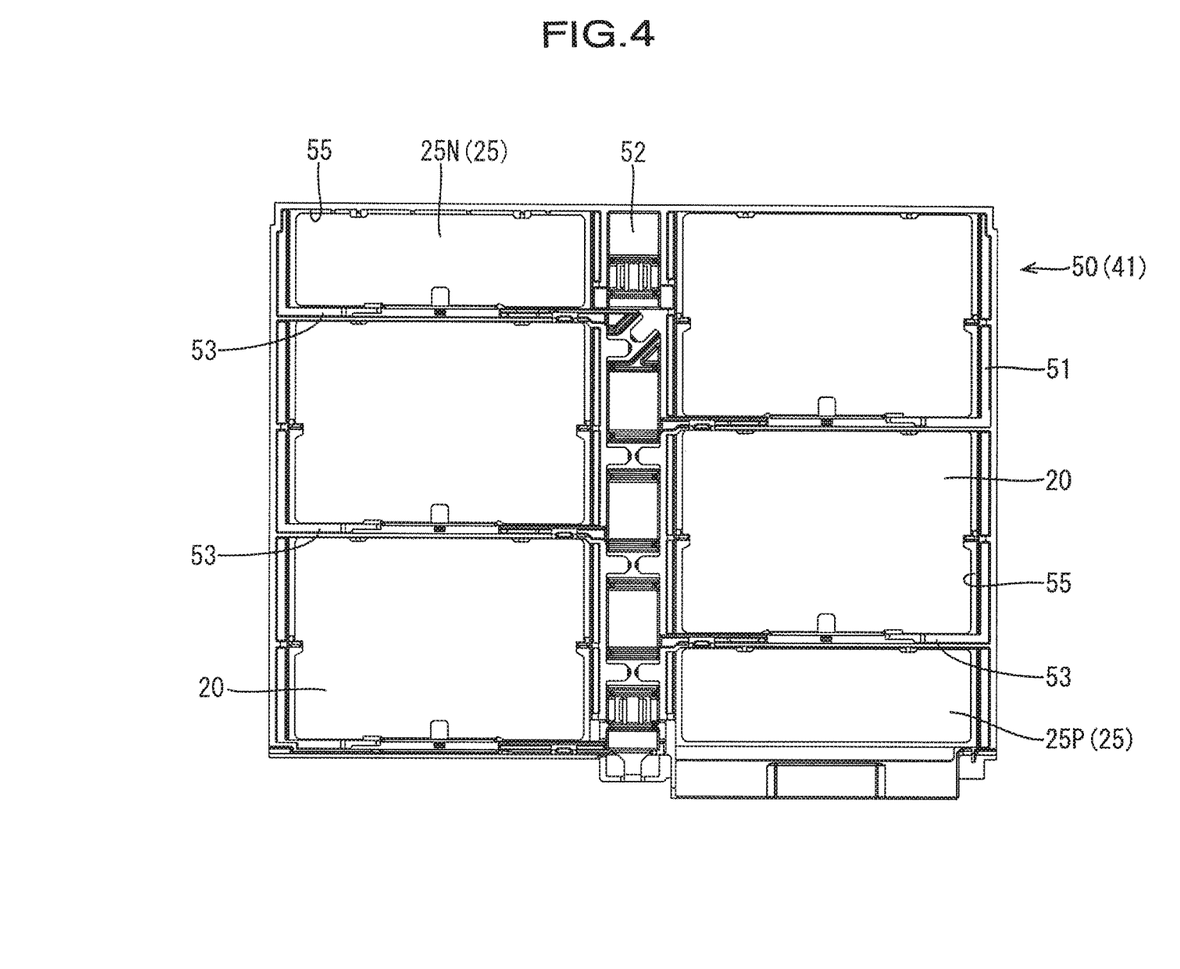
FIG. 4 is a plan view of a first protector to which busbars have been mounted.
Figure 5:
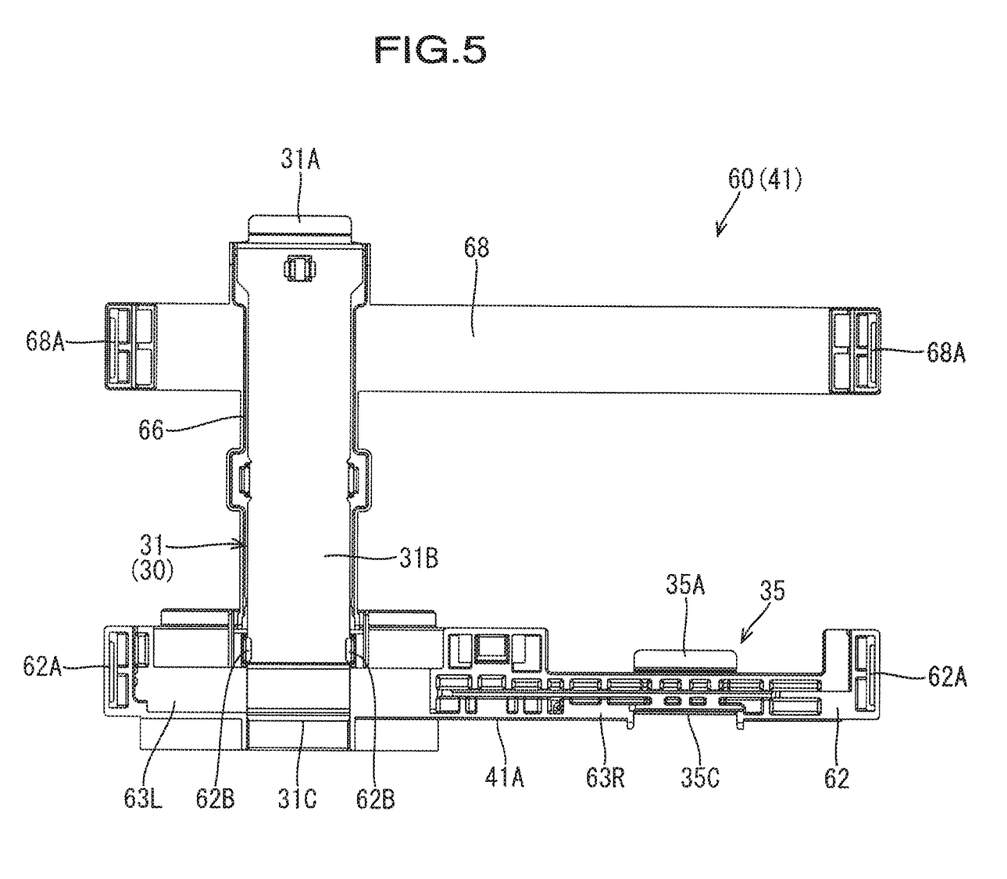
FIG. 5 is a plan view of a second protector to which external connection busbars have been mounted.

As shown in FIGS. 2, 4 and 5, the connection module 40 includes a plurality of busbars 20 each being configured to connect the positive electrode terminal 73P and the negative electrode terminal 73N of the electricity storage elements 71 that are adjacent to each other in the front-rear direction, an end busbar 25 that is connected to one of each of the pair of electrode terminals 73 located at front and rear ends, in the direction of arrangement of the electricity storage elements 71, of the electricity storage element group 70, a pair of external connection busbars (an example of "external connection member") 30 that are configured to be connected to the end busbars 25 and to which an external device (not shown) is to be connected, and an insulating protector 41 that holds the busbars 20 and 30 such that they are insulated from each other.

Each busbar 20 is formed in the shape of a substantially rectangular plate that is slightly longer in the lateral direction, for example, by pressing a metal plate of copper, a copper alloy, aluminum, an aluminum alloy, a stainless steel (SUS), or the like having excellent conductivity, or a metal plate formed by attaching an aluminum plate and a copper plate together.

The busbar 20 is sized to be placed on the electrode terminals 73 of the adjacent electricity storage elements 71 such that the busbar 20 spans the electrode terminals 73 of the electricity storage elements 71 that are adjacent in the front-rear direction. The adjacent electricity storage elements 71 are connected in series by electrically connecting the opposite end portions of the busbar 20 in the front-rear direction and the respective corresponding electrode terminals 73 through welding or the like. Note that in the present embodiment, the adjacent electricity storage elements 71 are connected in series by disposing the electrode terminals 73 of different polarities adjacent to each other in the adjacent electricity storage elements 71. However, some of the adjacent electricity storage elements 71 of the electricity storage element group 70 may be connected in parallel by disposing the electrode terminals 73 of the same polarity adjacent to each other in some of the adjacent electricity storage elements 71 of the electricity storage element group 70.

Each end busbar 25 is formed in the shape of a substantially rectangular plate that is slightly longer in the lateral direction, for example, by pressing a metal plate of copper, a copper alloy, aluminum, an aluminum alloy, a stainless steel (SUS), or the like having excellent conductivity, and the length in the front-rear direction is about half that of the busbar 20. In the present embodiment, the end busbars 25 are disposed on the left side of the rear end portion and the right side of the front end portion, respectively. The end busbar 25 disposed on the left side of the rear end portion is configured as a negative electrode end busbar 25N that is connected to the negative electrode terminal 73N of the electricity storage element 71 disposed at the rearmost portion, and the end busbar 25 disposed on the right side of the front end portion is configured as a positive electrode end busbar 25P that is connected to the positive electrode terminal 73P of the electricity storage element 71 disposed at the frontmost portion.

The pair of external connection busbars 30 are formed, for example, by pressing a metal plate of copper, a copper alloy, aluminum, an aluminum alloy, a stainless steel (SUS), or the like having excellent conductivity.

One of the pair of external connection busbars 30 is configured as a positive electrode external connection busbar (an example of the "second external connection member") 31 that is shorter in the front-rear direction, and the other of the pair of external connection busbars 30 is configured as a negative electrode external connection busbar (an example of the "first external connection member") 35 that is longer in the front-rear direction.

Figure 9:
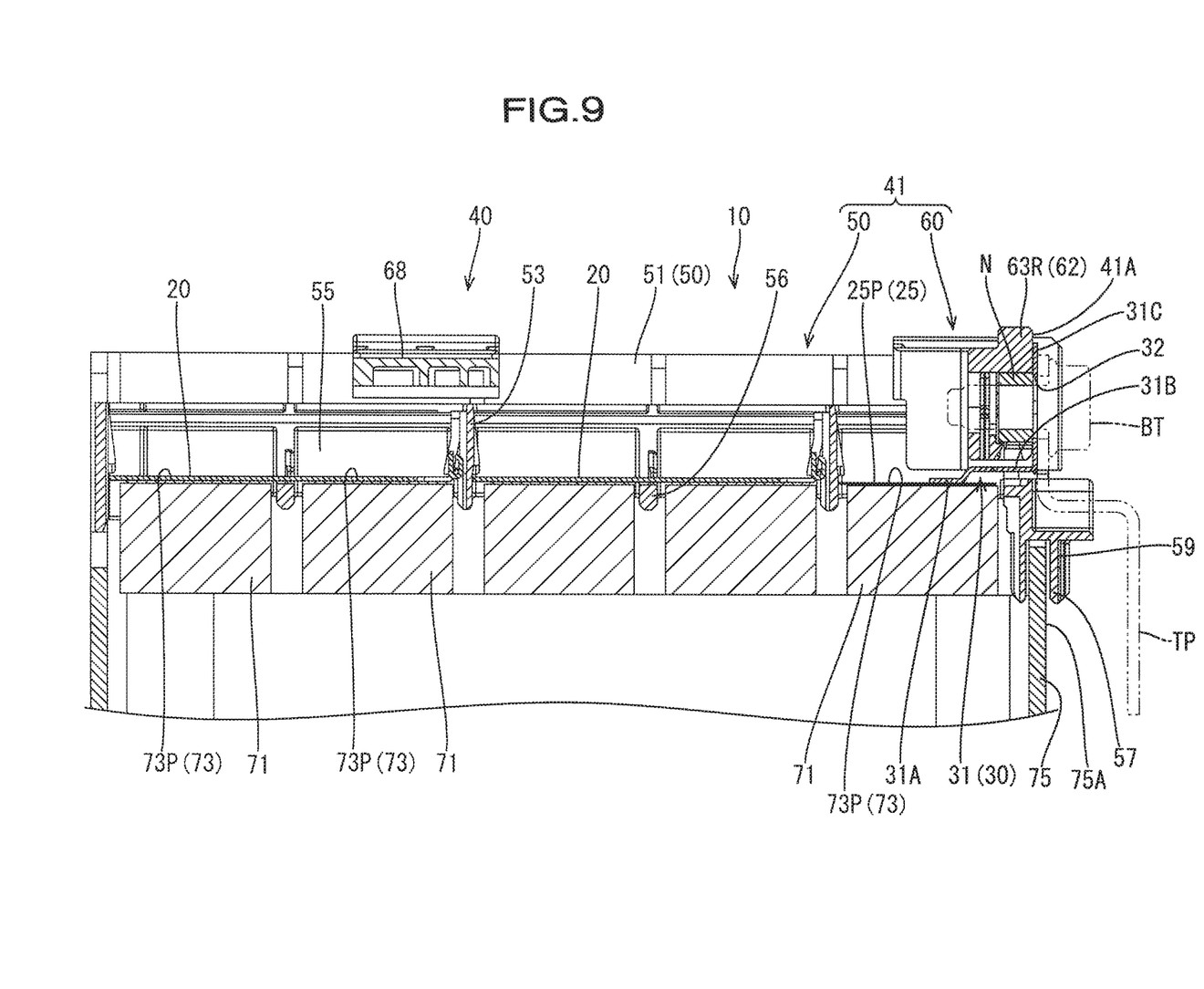
FIG. 9 is a cross-sectional view taken along the line B-B in FIG. 1.
Figure 10:
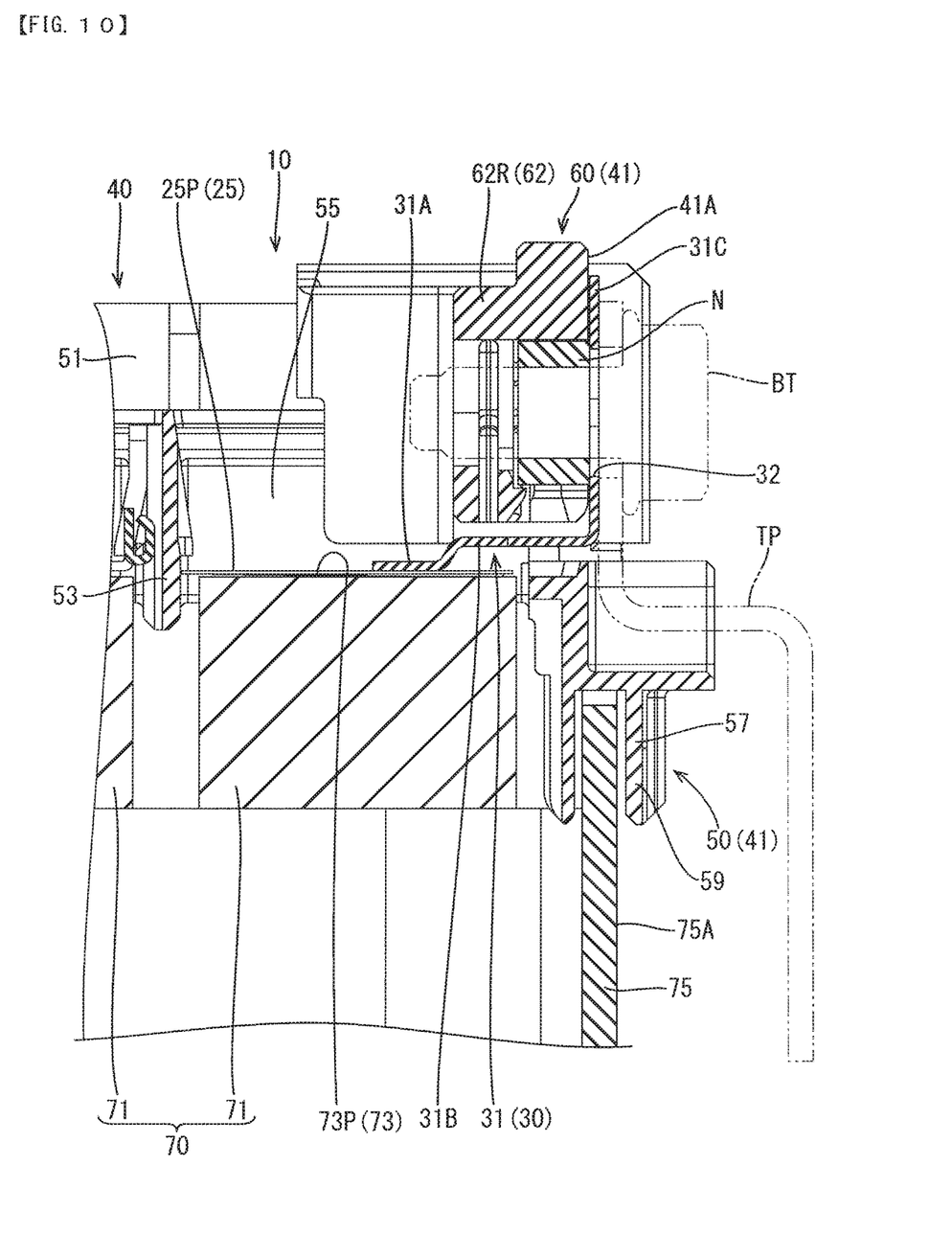
FIG. 10 is a partial enlarged view of the cross-sectional view shown in FIG. 9.

As shown in FIGS. 9 and 10, the positive electrode external connection busbar 31 includes a first busbar connection portion 31A that is connected to the positive electrode end busbar 25P of the electricity storage element group 70, a first terminal connection portion 31C that is bolted to a positive electrode terminal TP provided in an external device (not shown), and a short coupling portion 31B that links the first busbar connection portion 31A and the first terminal connection portion 31C together.

The first busbar connection portion 31A is disposed on the positive electrode end busbar 25P such that the first busbar connection portion 31A extends along the upper surface of the positive electrode end busbar 25P, and is electrically connected to the positive electrode end busbar 25P through welding or the like. Accordingly, when the connection module 40 is mounted to the electricity storage element group 70, and the plurality of electricity storage elements 71 are connected in series by the busbars 20, the power of the positive electrodes of the electricity storage element group 70 is output to the positive electrode external connection busbar 31 through the positive electrode end busbar 25P.

The short coupling portion 31B is formed continuously with the front end edge of the first busbar connection portion 31A such that the short coupling portion 31B is disposed at a position higher by one level than the first busbar connection portion 31A. On the other hand, the first terminal connection portion 31C is formed continuously with the front edge of the short coupling portion 31B such that the first terminal connection portion 31C extends upward from the front end edge of the short coupling portion 31B.

The first terminal connection portion 31C is disposed facing forward such that the first terminal connection portion 31C extends along a front outer wall 41A of the insulating protector 41, and a bolt insertion hole 32 through which a fastening bolt BT can be passed is formed in the first terminal connection portion 31C.

Figure 7:
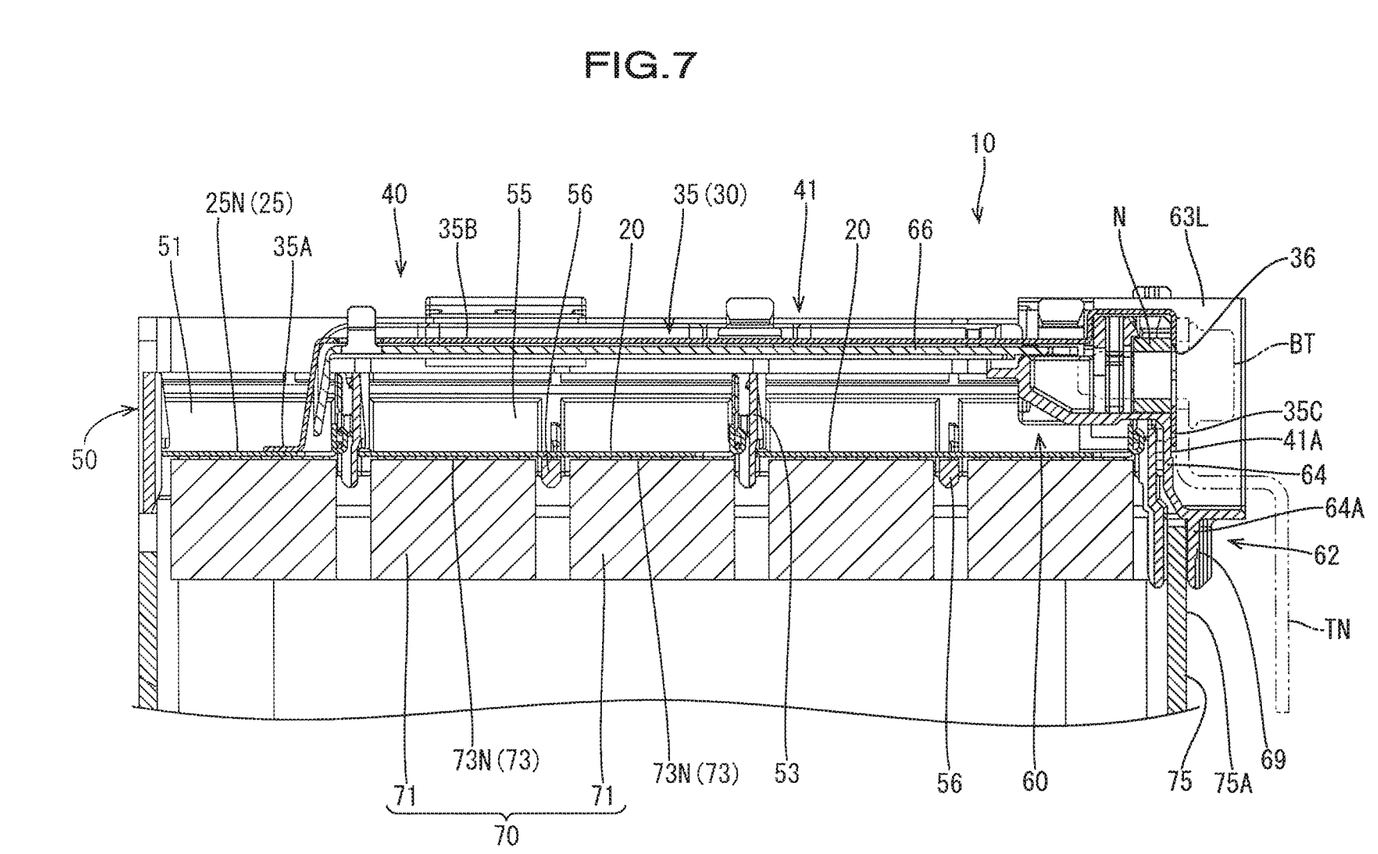
FIG. 7 is a cross-sectional view taken along the line A-A in FIG. 1.
Figure 8:
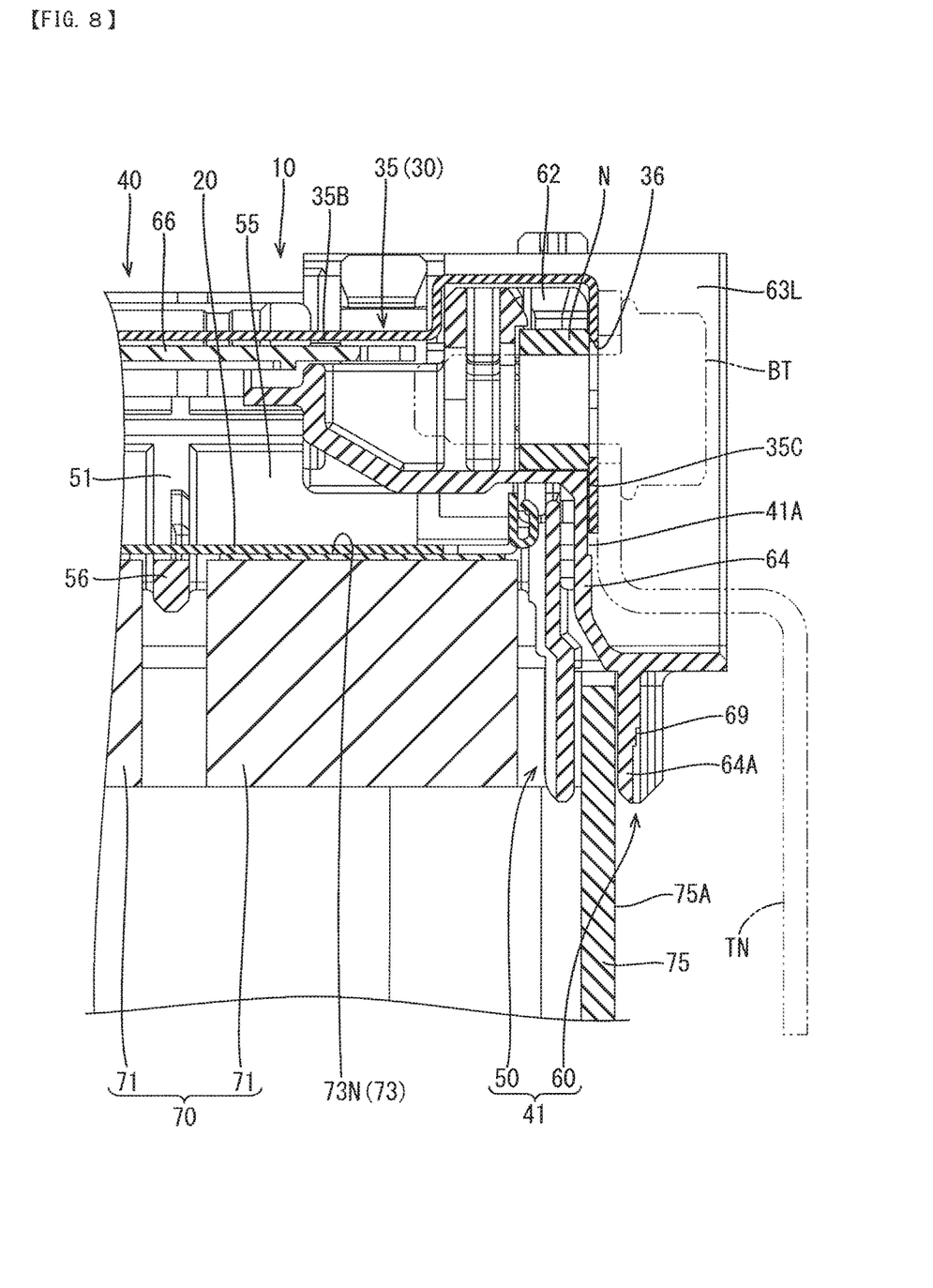
FIG. 8 is a partial enlarged view of the cross-sectional view shown in FIG. 7.

As shown in FIGS. 7 and 8, the negative electrode external connection busbar 35 includes a second busbar connection portion 35A that is connected to the upper surface of the negative electrode end busbar 25N of the electricity storage element group 70, a second terminal connection portion 35C that is bolted to a negative electrode terminal TN provided in the external device (not shown), and a long coupling portion 35B that links the second busbar connection portion 35A and the second terminal connection portion 35C together.

The second busbar connection portion 35A is disposed on the negative electrode end busbar 25N such that the second busbar connection portion 35A extends along the upper surface of the negative electrode end busbar 25N, and is electrically connected to the negative electrode end busbar 25N through welding or the like. Accordingly, when the connection module 40 is mounted to the electricity storage element group 70, the power of the negative electrodes of the electricity storage element group 70 is output from the negative electrode external connection busbar 35 through the negative electrode end busbar 25N.

The long coupling portion 35B is longer than the short coupling portion 31B, and has a shape extending in the front-rear direction from the position of the negative electrode end busbar 25N to the end portion on the side where the positive electrode end busbar 25P is disposed. In addition, the long coupling portion 35B is formed continuously with the front end edge of the second busbar connection portion 35A such that the long coupling portion 35B extends straight in the front-rear direction at a position higher than the short coupling portion 31B. The front end portion of the long coupling portion 35B is formed at a position higher by one level than the other portions of the long coupling portion 35B, and the second terminal connection portion 35C is formed continuously with the front end edge of the long coupling portion 35B such that the second terminal connection portion 35C extends downward.

The second terminal connection portion 35C is disposed facing forward such that the second terminal connection portion 35C extends along the front outer wall 41A of the insulating protector 41, and a bolt insertion hole 36 through which the fastening bolt BT can pass is formed in the second terminal connection portion 35C.

As shown in FIGS. 2 to 5, the insulating protector 41 includes a first protector 50 that holds the plurality of busbars 20 and the pair of end busbars 25, and a second protector 60 that holds the pair of external connection busbars 30.

The first protector 50 is an insulating member made of a synthetic resin, and includes a substantially frame-shaped protector body 51. The interior of the protector body 51 is divided by a partition wall 53, thus providing busbar holding portions 55 that separately hold the plurality of busbars 20 and the pair of end busbars 25.

Each busbar holding portion 55 has a substantially rectangular shape in a plan view, is open at the top and the bottom, and holds a busbar 20 or an end busbar 25 therein. The upper end opening of the busbar holding portion 55 has a shape that is substantially the same as the outer shape of the busbar 20 or the end busbar 25. As shown in FIGS. 7 to 9, the busbar 20 is held in the busbar holding portion 55 by a supporting portion 56 provided at the bottom portion of the busbar holding portion 55.

As shown in FIG. 4, the same number of (three in the present embodiment) busbar holding portions 55 are provided on the opposite sides in the lateral direction, with respect to a wiring path 52 extending in the front-rear direction and provided at substantially the central portion of the protector body 51 in the lateral direction.

Of the busbar holding portions 55 included in the busbar holding portions 55 that are disposed on the right side of the wiring path 52, the busbar holding portion 55 at the right front end portion holds the positive electrode end busbar 25P, and each of the two busbar holding portions 55 on the rear side holds a busbar 20. On the other hand, of the busbar holding portions 55 included in the busbar holding portions 55 that are disposed on the left side of the wiring path 52, the busbar holding portion 55 at the left rear end portion holds the negative electrode end busbar 25N, and each of the two busbar holding portions 55 on the front side holds a busbar 20.

Accordingly, the busbar holding portions 55 of the first protector 50 are disposed such that they are staggered in the front-rear direction with the wiring path 52 as a boundary, and the plurality of electricity storage elements 71 are connected in series by the busbars 20 held by the plurality of busbar holding portions 55 of the first protector 50.

Figure 3:
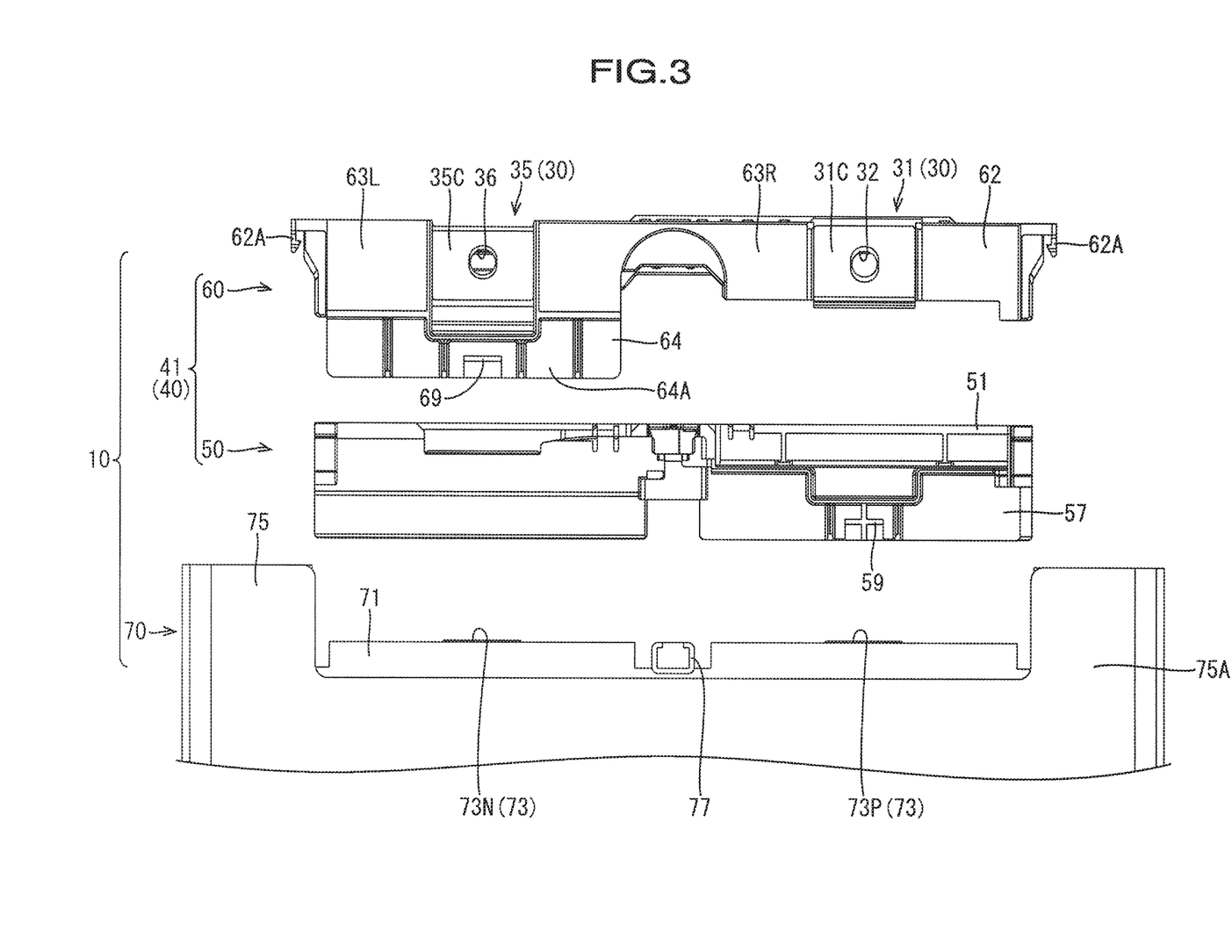
FIG. 3 is an exploded front view of the electricity storage module.

As shown in FIG. 3, a guide wall 57 extending furthest downward in the first protector 50 is provided at the lower end portion of the first protector 50 that is located to the right of substantially the central portion in the lateral direction. The guide wall 57 is configured to guide the connection module 40 to a proper position relative to the electricity storage element group 70 by abutting against an outer surface 75A of the frame 75 of the electricity storage element group 70 when mounting the connection module 40 to the electricity storage element group 70.

The second protector 60 is an insulating member made of a synthetic resin, and is formed as a member separate from the first protector 50 as shown in FIG. 3. As shown in FIG. 5, the second protector 60 includes a first busbar holding portion 62 that holds the front end portion of the negative electrode external connection busbar 35 and the positive electrode external connection busbar 31, a second busbar holding portion 66 that holds the long coupling portion 35B of the negative electrode external connection busbar 35, and a fixing portion 68 that fixes the second busbar holding portion 66 to the first protector 50.

As shown in FIGS. 2 and 5, the first busbar holding portion 62 has a shape that is longer in the lateral direction, and the second protector 60 is fixed to the first protector 50 by a pair of front-side locking pieces 62A provided at opposite end portions of the first busbar holding portion 62 and locked portions (not shown) provided in the first protector 50 being locked to each other in the vertical direction.

As shown in FIG. 5, a pair of busbar locking pieces 62B are provided to the left of substantially the central portion of the first busbar holding portion 62 in the left-right direction, and the front end portion of the negative electrode external connection busbar 35 is held by the first busbar holding portion 62 as a result of the pair of busbar locking pieces 62B and opposite side edges, in the left-right direction, of the front portion of the long coupling portion 35B being locked to each other in the vertical direction.

On the other hand, the positive electrode external connection busbar 31 is mounted from below to the right, in the left-right direction, of the first busbar holding portion 62 relative to substantially the central portion, and is fixed thereto by a fixing means (not shown).

One side of the front end portion of the first busbar holding portion 62 is configured to be longer in the vertical direction than the other side thereof. In the present embodiment, as shown in FIG. 3, the length, in the vertical direction, of a left portion 63L located to the left relative to substantially the central portion where the negative electrode external connection busbar 35 is disposed is set to be approximately twice the length, in the vertical direction, of a right portion 63R located to the right. As shown in FIGS. 7 to 10, nuts N whose axial direction coincides with the direction of arrangement of the electricity storage elements 71 are mounted to the upper portion of the left portion 63L and the right portion 63R of the first busbar holding portion 62.

The front surfaces of the nuts N, the front surface of the upper portion of the left portion 63L, and the front surface of the right portion 63R are disposed facing forward such that they are flush with each other, and constitute the upper half of the front outer wall 41A of the insulating protector 41 when the second protector 60 is mounted to the first protector 50 to form an insulating protector 41. Then, the second terminal connection portion 35C of the negative electrode external connection busbar 35 and the first terminal connection portion 31C of the positive electrode external connection busbar 31 are disposed along the front outer wall 41A.

As shown in FIGS. 7 and 8, the lower portion of the left portion 63L on the front surface of the first busbar holding portion 62 is configured as an insulating wall 64 extending downward from a position higher than the height position of the first protector 50 at which the busbar 20 is disposed, and the insulating wall 64 provides insulation between the busbar 20 and the second terminal connection portion 35C of the negative electrode external connection busbar 35 by being disposed therebetween.

As shown in FIGS. 7 and 8, the lower end portion of the insulating wall 64 is configured as a guide portion 64A protruding furthest downward in the second protector 60, and is configured to guide the connection module 40 to a proper position relative to the electricity storage element group 70 by the guide portion 64A abutting against the outer surface 75A of the frame 75 of the electricity storage element group 70, together with the guide wall 57 of the first protector 50, when mounting the connection module 40 to the electricity storage element group 70.

As shown in FIG. 2, the second busbar holding portion 66 has a shape extending linearly in the front-rear direction from the position of the first busbar holding portion 62 to the position of the negative electrode end busbar 25N, and the long coupling portion 35B of the negative electrode external connection busbar 35 is disposed on the upper surface of the second busbar holding portion 66. That is, as shown in FIG. 7, the second busbar holding portion 66 is disposed between the busbars 20 and the long coupling portion 35B, and the second busbar holding portion 66 provides insulation between the busbars 20 and the long coupling portion 35B.

As shown in FIGS. 2 and 5, the fixing portion 68 has a shape extended in the lateral direction from the rear portion of the second busbar holding portion 66. A pair of rear-side locking pieces 68A capable of locking to locked portions (not shown) of the first protector 50 in the vertical direction are provided at opposite end portions of the fixing portion 68, and the pair of rear-side locking pieces 68A are configured to fix the second protector 60 to the first protector 50 by locking to the locked portions of the first protector 50, together with the pair of front-side locking pieces 62A of the first busbar holding portion 62.

Figure 1:
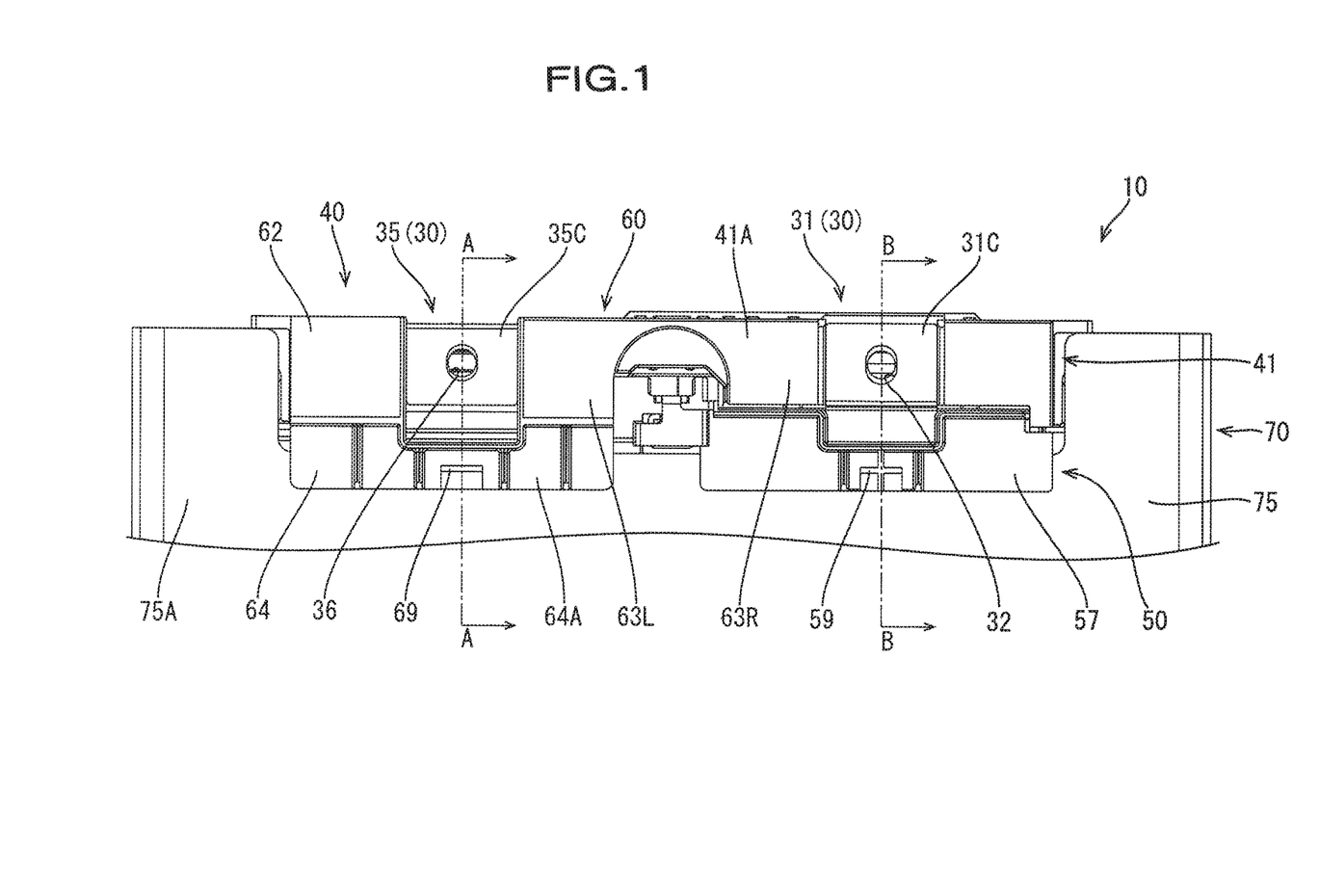
FIG. 1 is a front view of an electricity storage module.

As shown in FIGS. 1 and 3, a first identifier 59 is formed on the guide wall 57 of the first protector 50, and a second identifier 69 is formed on the insulating wall 64 of the second protector 60.

The first identifier 59 is disposed at the lower end portion of the central portion, in the lateral direction, on the front surface of the guide wall 57, and directly below the first terminal connection portion 31C of the positive electrode external connection busbar 31 held by the second protector 60. The first identifier 59 has a plus-sign shape in a front view, and is formed protruding forward from the front surface of the guide wall 57.

On the other hand, the second identifier 69 is disposed on the front surface of the guide portion 64A of the insulating wall 64, and directly below the second terminal connection portion 35C of the negative electrode external connection busbar 35 held by the second protector 60. The second identifier 69 has a minus-sign shape in a front view, and is formed protruding forward from the front surface of the guide portion 64A.

That is, the first identifier 59 indicates that the polarity of the first terminal connection portion 31C of the positive electrode external connection busbar 31 is positive, and the second identifier 69 indicates that the polarity of the second terminal connection portion 35C of the negative electrode external connection busbar 35 is negative.

The first protector 50 is made of a synthetic resin having a color different from that of the second protector 60. Specifically, the first protector 50 is made of a synthetic resin colored a reddish color, and the second protector 60 is made of a synthetic resin having a color different from a reddish color. Consequently, the first identifier 59 is formed by a reddish color that is different from the color of the second identifier 69.

The present embodiment has the configuration as described above. Next, the operation and effects of the connection module 40 and the electricity storage module 10 will be described.

As shown in FIG. 2, after the connection module 40 has been mounted to the electricity storage element group 70, the electricity storage elements 71 of the electricity storage module 10 can hardly be seen from above due to the presence of the connection module 40. This makes it difficult to determine the polarity of each of the pair of external connection busbars 30 of the connection module 40 even though the external connection busbars 30 have polarities different from each other. Accordingly, there is the possibility that the terminals TP and TN of the external device may be mistakenly connected to the external connection busbar 30.

However, as shown in FIGS. 1 and 3, according to the present embodiment, the first identifier 59 having a plus-sign shape is formed at a portion of the positive electrode external connection busbar 31 that is located directly below the first terminal connection portion 31C, and the second identifier 69 having a minus-sign shape is formed at a portion of the negative electrode external connection busbar 35 that is located directly below the second terminal connection portion 35C. That is, the polarity of each of the external connection busbars 30 can be easily determined by checking the identifier 59 and 69. This makes it possible to prevent the positive electrode terminal TP and the negative electrode terminal TN of the external device from being mistakenly connected to the positive electrode external connection busbar 31 and the negative electrode external connection busbar 35.

According to the present embodiment, the first identifier 59 is formed by a color different from that of the second identifier 69 by the first protector 50 being formed by a reddish color that is different from the color of the second protector 60. Accordingly, the polarity of each of the external connection busbars 30 can be easily identified, thus making it possible to further prevent the polarities of the external connection busbars 30 from being mistaken when connecting the external device thereto.

The first identifier 59 and the second identifier 69 are provided on the front outer wall 41A of the insulating protector 41 on which the first terminal connection portion 31C of the positive electrode external connection busbar 31 and the second terminal connection portion 35C of the negative electrode external connection busbar 35 are disposed. Accordingly, the polarity of each of the external connection busbars 30 can be more easily identified as compared with, for example, a case where the identifiers are provided on an upper outer wall that is different from the front outer wall of the insulating protector on which the terminal connection portions are disposed, thus making it possible to further prevent the polarities of the external connection busbars 30 from being mistaken when connecting the external device thereto.

The second identifier 69 is provided on the insulating wall 64 that provides insulation between the busbar 20 held by the first protector 50 and the negative electrode external connection busbar 35 held by the second protector 60, and on the front surface of the guide portion 64A that guides the connection module 40 to a proper position relative to the electricity storage element group 70 when mounting the connection module 40 to the electricity storage element group 70.

That is, the portion on which the second identifier 69 is provided can be used, not only as the insulating wall 64 and the guide portion 64A, but also as the wall for providing the second identifier 69. Accordingly, it is not necessary to separately provide the portion for providing the second identifier 69, thus making it possible to prevent the structure of the connection module 40 from becoming complex.

Also, the first identifier 59 is provided on the guide wall 57 that guides the connection module 40 to a proper position relative to the electricity storage element group 70, together with the guide portion 64A of the second protector 60, when mounting the connection module to the electricity storage element group. Accordingly, it is not necessary to separately provide the portion for providing the first identifier 59, thus making it possible to prevent the structure of the connection module 40 from becoming complex.

Other Embodiments

The technique disclosed in the present specification is not limited to the embodiments described and illustrated above, and includes, for example, various embodiment as follows.

(1) The above embodiment shows a configuration in which the first identifier 59 indicates that the polarity of the first terminal connection portion 31C of the positive electrode external connection busbar 31 is positive, and the second identifier 69 indicates that the polarity of the second terminal connection portion 35C of the negative electrode external connection busbar 35 is negative. However, the technique disclosed in the present specification is not limited thereto. The first identifier and the second identifier may be configured as identifiers for identifying protectors similar to the first protector and the second protector, or may be configured as identifiers for identifying busbars or external connection busbars that are attached to the respective protectors.

(2) The above embodiment shows a configuration in which the first terminal connection portion 31C of the positive electrode external connection busbar 31 and the second terminal connection portion 35C of the negative electrode external connection busbar 35 are provided on the front outer wall 41A of the connection module 40. However, the technique disclosed in the present specification is not limited thereto. The first terminal connection portion of the positive electrode external connection busbar may be provided on the front outer wall of the connection module, the terminal connection portion of the negative electrode external connection busbar may be provided on the rear outer wall of the connection module, and the respective identifiers may be provided correspondingly.

(3) The above embodiment shows a configuration in which the first identifier 59 is provided directly below the first terminal connection portion 31C of the positive electrode external connection busbar 31, and the second identifier 69 is provided directly below the second terminal connection portion 35C of the negative electrode external connection busbar 35. However, the technique disclosed in the present specification is not limited thereto. The identifiers may be provided on the periphery of the respective terminal connection portions, for example, just beside the terminal connection portions of the respective external connection busbars.

(4) The above embodiment shows a configuration in which each busbar 20 is connected, through welding, to the positive electrode terminal 73P and the negative electrode terminal 73N of each electricity storage element 71. However, the technique disclosed in the present specification is not limited thereto. It is possible to adopt a configuration in which each busbar may be connected, through bolt-fastening, to the respective electrode terminals of each electricity storage element.

LIST OF REFERENCE NUMERALS

20: Busbar
31: Positive electrode external connection busbar (example of "first external connection member")
31C: First terminal connection portion (example of "terminal connection portion")
35: Negative electrode external connection busbar (example of "second external connection member")
35C: Second terminal connection portion (example of "terminal connection portion")
40: Connection module
41: Insulating protector
41A: Front outer wall (example of "outer wall")
50: First protector
57: Guide wall (example of "guide portion")
59: First identifier
60: Second protector
64: Insulating wall
64A: Guide portion
69: Second identifier
70: Electricity storage element group
71: Electricity storage element
73: Electrode terminal
73N: Negative electrode terminal
73P: Positive electrode terminal
75: Frame
TN: Negative electrode terminal of external device (example of "terminal of external device")
TP: Positive electrode terminal of external device (example of "terminal of external device")

What is claimed is:

1. A connection module configured to be attached to an electricity storage element group in which a plurality of electricity storage elements each including positive and negative electrode terminals are arranged, the connection module comprising:
   a plurality of busbars configured to connect the electrode terminals of adjacent electricity storage elements to each other; and
   an insulating protector configured to be fixed to the electricity storage element group in a condition in which the insulating protector holds the plurality of busbars,
   wherein the insulating protector includes a first protector and a second protector that is separate from the first protector,
   the first protector is provided with a first identifier,
   the second protector is provided with a second identifier that is different from the first identifier,
   wherein the insulating protector holds the plurality of busbars, a first external connection member configured to output power of one polarity of the electricity storage element group, and a second external connection member configured to output power of the other polarity of the electricity storage element group,
   the first identifier is configured as an identifier for identifying the polarity of the first external connection member, and
   the second identifier is configured as an identifier for identifying the polarity of the second external connection member.

2. The connection module according to claim 1, wherein the first identifier is formed by a color different from a color of the second identifier by the first protector being formed by a color different from a color of the second protector.

3. The connection module according to claim 1, wherein each of the first external connection member and the second external connection member is a terminal connection portion to which a terminal of an external device is to be connected, and includes a terminal connection portion disposed on an outer wall of the insulating protector, and
the first identifier and the second identifier are provided on the outer wall of the insulating protector on which the terminal connection portions are disposed.

4. The connection module according to claim 2, wherein each of the first external connection member and the second external connection member is a terminal connection portion to which a terminal of an external device is to be connected, and includes a terminal connection portion disposed on an outer wall of the insulating protector, and
the first identifier and the second identifier are provided on the outer wall of the insulating protector on which the terminal connection portions are disposed.

5. The connection module according to claim 1, wherein the first protector holds the plurality of busbars, the second protector holds the first external connection member and the second external connection member,
a portion of an outer wall of the second protector is formed by an insulating wall disposed between the first external connection member and the plurality of busbars, and
the second identifier is provided on the insulating wall.

6. The connection module according to claim 2, wherein the first protector holds the plurality of busbars, the second protector holds the first external connection member and the second external connection member,
a portion of an outer wall of the second protector is formed by an insulating wall disposed between the first external connection member and the plurality of busbars, and
the second identifier is provided on the insulating wall.

7. An electricity storage module comprising:
the electricity storage element group including a frame configured to accommodate the plurality of electricity storage elements; and
a connection module configured to be attached to the electricity storage element group in which the plurality of electricity storage elements each including positive and negative electrode terminals are arranged, the connection module comprising:
   a plurality of busbars configured to connect the electrode terminals of adjacent electricity storage elements to each other; and an insulating protector configured to be fixed to the electricity storage element group in a condition in which the insulating protector holds the plurality of busbars,
wherein the insulating protector includes a first protector and a second protector that is separate from the first protector,
the first protector is provided with a first identifier,
the second protector is provided with a second identifier that is different from the first identifier,
wherein a portion of the insulating protector on which the first identifier or the second identifier is provided is configured as a guide portion that protrudes toward the electricity storage element side, thereby abutting against the frame to guide the connection module to a proper position when mounting the connection module to the electricity storage element group.

\* \* \* \* \*